US008293018B2

(12) United States Patent
Koenig et al.

(10) Patent No.: US 8,293,018 B2
(45) Date of Patent: Oct. 23, 2012

(54) SYSTEM AND METHOD FOR THE CONTINUOUS TREATMENT OF SOLIDS AT NON-ATMOSPHERIC PRESSURE

(75) Inventors: Peter M. Koenig, Minneapolis, MN (US); Gregory J. Kimball, Blaine, MN (US); David Lonnie Phillips, Shoreview, MN (US)

(73) Assignee: Bepex International, LLC, Minneapolis, MN (US)

( * ) Notice: Subject to any disclaimer, the term of this patent is extended or adjusted under 35 U.S.C. 154(b) by 0 days.

(21) Appl. No.: 13/279,065

(22) Filed: Oct. 21, 2011

(65) Prior Publication Data

US 2012/0103325 A1      May 3, 2012

Related U.S. Application Data

(60) Provisional application No. 61/405,844, filed on Oct. 22, 2010.

(51) Int. Cl.
    *C08B 30/00* (2006.01)
(52) U.S. Cl. .......................................... 127/67
(58) Field of Classification Search .................. None
    See application file for complete search history.

(56) References Cited

U.S. PATENT DOCUMENTS

| 3,133,836 A | * | 5/1964 | Winfrey et al. ............ 127/71 |
| 3,276,907 A | * | 10/1966 | Huber et al. .............. 127/28 |
| 3,310,881 A | | 3/1967 | Fritzberg |
| 3,986,832 A | | 10/1976 | Smorenburg |
| 4,181,072 A | | 1/1980 | Hirahara |
| 4,255,459 A | | 3/1981 | Glen |
| 4,302,111 A | | 11/1981 | Harris |
| 4,306,493 A | | 12/1981 | Hain et al. |
| 4,410,553 A | | 10/1983 | McGinty |
| 4,505,937 A | | 3/1985 | Demeulemeester et al. |
| 4,547,383 A | | 10/1985 | Goldhahn |
| 4,600,472 A | | 7/1986 | Pitchon et al. |
| 4,667,418 A | | 5/1987 | White |
| 4,699,797 A | | 10/1987 | Fast |
| 4,787,300 A | | 11/1988 | Mette |
| 4,796,523 A | | 1/1989 | Mette |

(Continued)

FOREIGN PATENT DOCUMENTS

CN         101549162         10/2009

(Continued)

OTHER PUBLICATIONS

Notification of Transmittal of the International Search Report and the Written Opinion of the International Searching Authority, or the Declaration of corresponding application PCT/US2011/057345 mailed Dec. 27, 2011, 11 pages.

(Continued)

*Primary Examiner* — Melvin C Mayes
*Assistant Examiner* — Stefanie Cohen
(74) *Attorney, Agent, or Firm* — Fredrikson & Byron, PA

(57) ABSTRACT

Systems and processes may be used for continuously processing a solid material such as a solid starch-bearing material at a non-atmospheric pressure. In some examples, the material is delivered to a process vessel at substantially the same non-atmospheric pressure condition as the process vessel so as to avoid shearing the material. In some examples, the solid material is continuously fed into a process vessel, continuously processed in the process vessel, and continuously discharged from the process vessel.

17 Claims, 9 Drawing Sheets

U.S. PATENT DOCUMENTS

| | | | |
|---|---|---|---|
| 4,830,865 | A | 5/1989 | McFarlane et al. |
| 4,844,931 | A | 7/1989 | Webb |
| 4,882,188 | A | 11/1989 | Sawada et al. |
| 4,903,414 | A | 2/1990 | White et al. |
| 4,921,719 | A | 5/1990 | Kohlbach |
| 5,080,164 | A | 1/1992 | Hermans |
| 5,137,740 | A | 8/1992 | Benson et al. |
| 5,266,343 | A | 11/1993 | Stauffer |
| 5,427,810 | A | 6/1995 | Vowerck et al. |
| 5,472,732 | A | 12/1995 | Ohkuma et al. |
| 5,546,849 | A | 8/1996 | Shefet |
| 5,619,908 | A | 4/1997 | Catelli et al. |
| 5,761,989 | A | 6/1998 | Inakuma et al. |
| 5,792,500 | A | 8/1998 | Housset et al. |
| 5,824,187 | A | 10/1998 | Richter et al. |
| 5,919,500 | A | 7/1999 | Lehmberg et al. |
| 5,941,165 | A | 8/1999 | Butte |
| 6,015,231 | A | 1/2000 | Swartzel et al. |
| 6,058,828 | A | 5/2000 | Wei et al. |
| 6,063,336 | A | 5/2000 | Meredith et al. |
| 6,068,874 | A | 5/2000 | Grocholski |
| 6,071,474 | A | 6/2000 | Martinsen et al. |
| 6,101,926 | A | 8/2000 | Miyagawa et al. |
| 6,263,785 | B1 | 7/2001 | Zittel |
| 6,572,913 | B2 | 6/2003 | DeFrancisci et al. |
| 6,613,371 | B2 | 9/2003 | Delrue et al. |
| 6,676,986 | B1 | 1/2004 | Huttenbauer, Jr. |
| 6,780,448 | B1 | 8/2004 | Howard |
| 7,147,363 | B1 | 12/2006 | Wuest et al. |
| 7,722,771 | B2 | 5/2010 | Chordia et al. |
| 7,722,912 | B2 | 5/2010 | Hotek et al. |
| 2005/0083778 | A1 | 4/2005 | Wuest et al. |
| 2005/0146983 | A1 | 7/2005 | Hermsmeyer et al. |
| 2006/0251791 | A1 | 11/2006 | Rubio et al. |
| 2008/0311259 | A1 | 12/2008 | Singh et al. |
| 2010/0040732 | A1 | 2/2010 | Van Drunen et al. |
| 2010/0068357 | A1 | 3/2010 | Osborn |
| 2010/0092639 | A1 | 4/2010 | Upreti et al. |
| 2010/0173060 | A1 | 7/2010 | Perren et al. |

FOREIGN PATENT DOCUMENTS

| | | |
|---|---|---|
| EP | 0024152 | 2/1981 |
| EP | 0031544 | 7/1981 |
| EP | 0556101 | 8/1993 |
| GB | 414067 | 7/1934 |
| GB | 1083008 | 9/1967 |
| KR | 20040096723 | 11/2004 |
| WO | 9603624 | 2/1996 |
| WO | 0057722 | 10/2000 |
| WO | 0067908 | 11/2000 |
| WO | 2007076436 | 7/2007 |
| WO | 2009158588 | 12/2009 |

OTHER PUBLICATIONS

Buhler, Inc., "Flour Heat Treatment FHT", http://www.buhlergroup.com/global/en/products/flour-heat-treatment-fht.htm, (Retrieved on Mar. 8, 2012) 1 pg.

Ventilex USA, Inc., "Steam Pasteurization of Nuts and Seeds", http://www.ventilex.net/brochure/, (Retrieved on Mar. 8, 2012) 1 pg.

Safesteril, "Continuous Sterilization Process for Spices, Herbs, Ingredients, Seeds and Plants", http://www.safesteril.com/en/theproducts.php, (Retrieved on Mar. 8, 2012) 1 pg.

JBT Corporation, "JSP-I Jet Stream (R) Almond Surface Pasteurization System", http://www.jbtcorporation.com/JBT%20FoodTech/Solutions/Applications/Almonds.aspx?textSize=large, (Retrieved on Mar. 8, 2012) 1 pg.

* cited by examiner

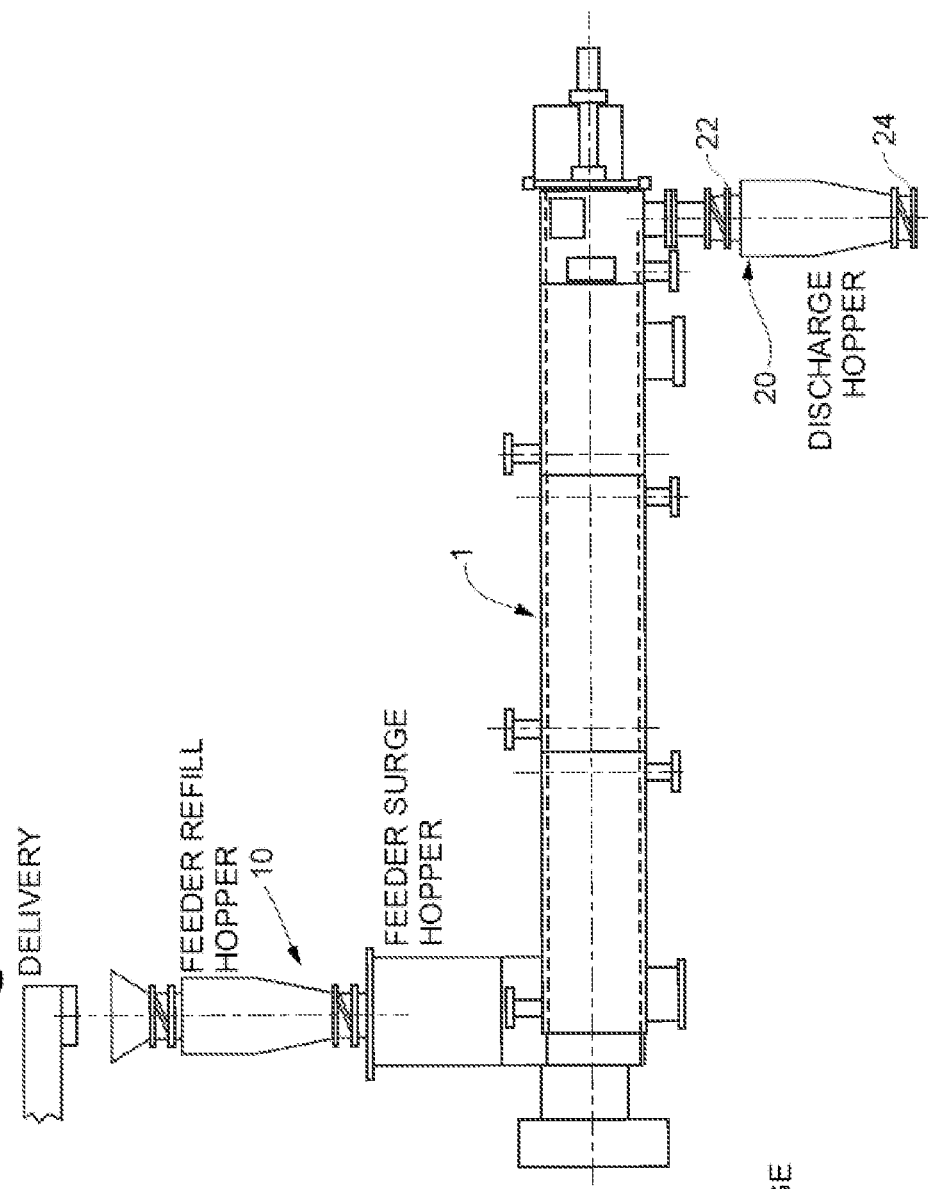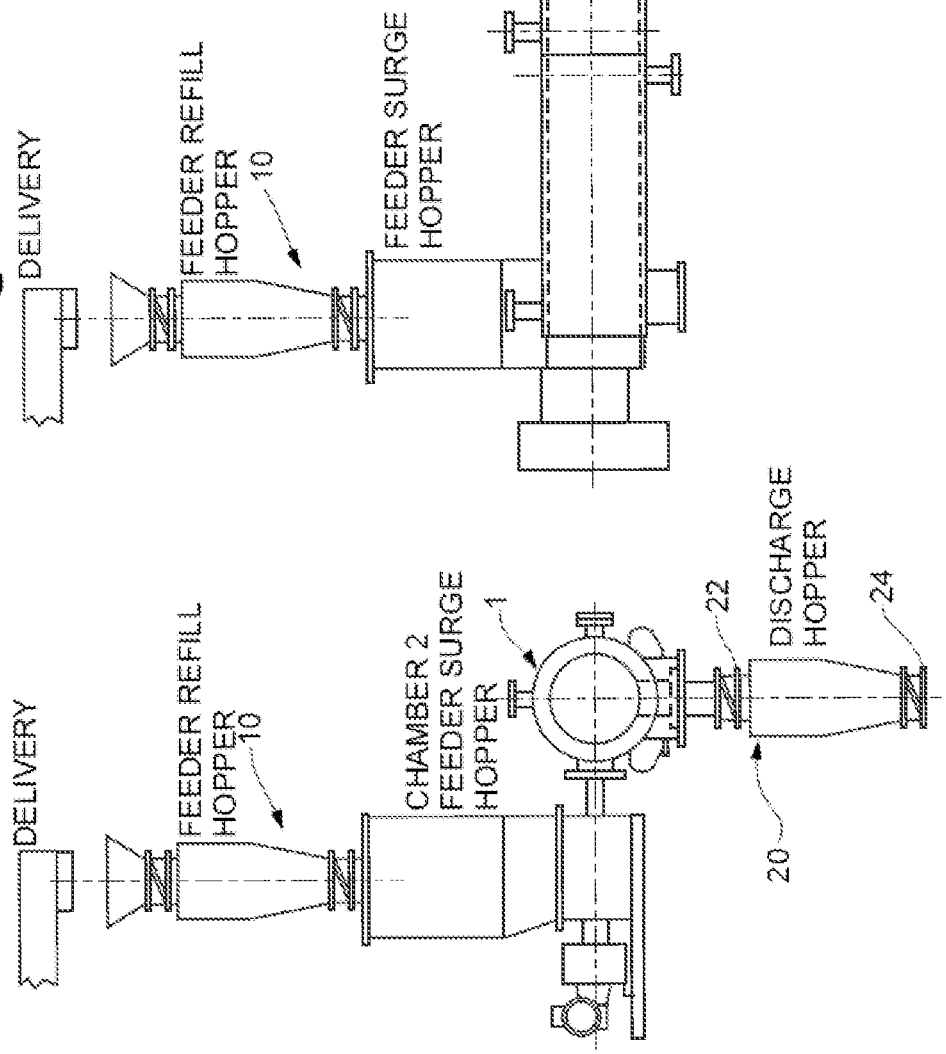

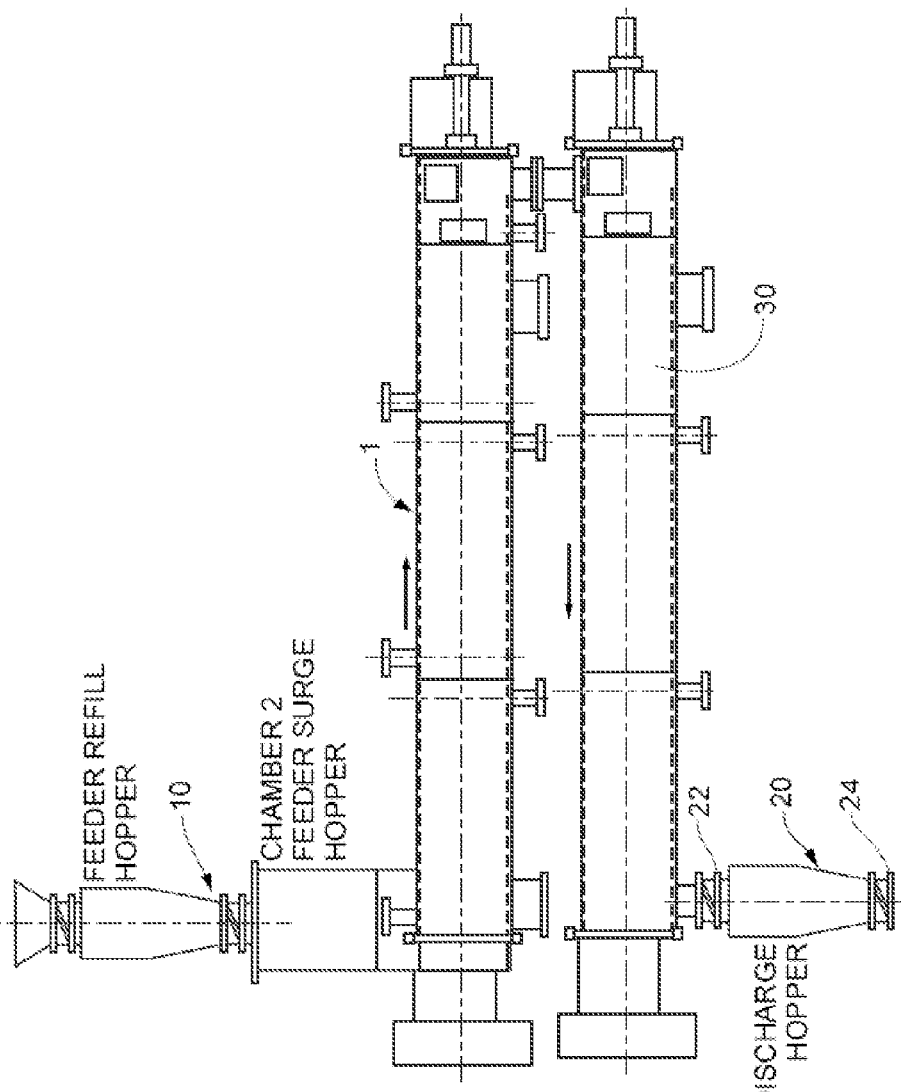
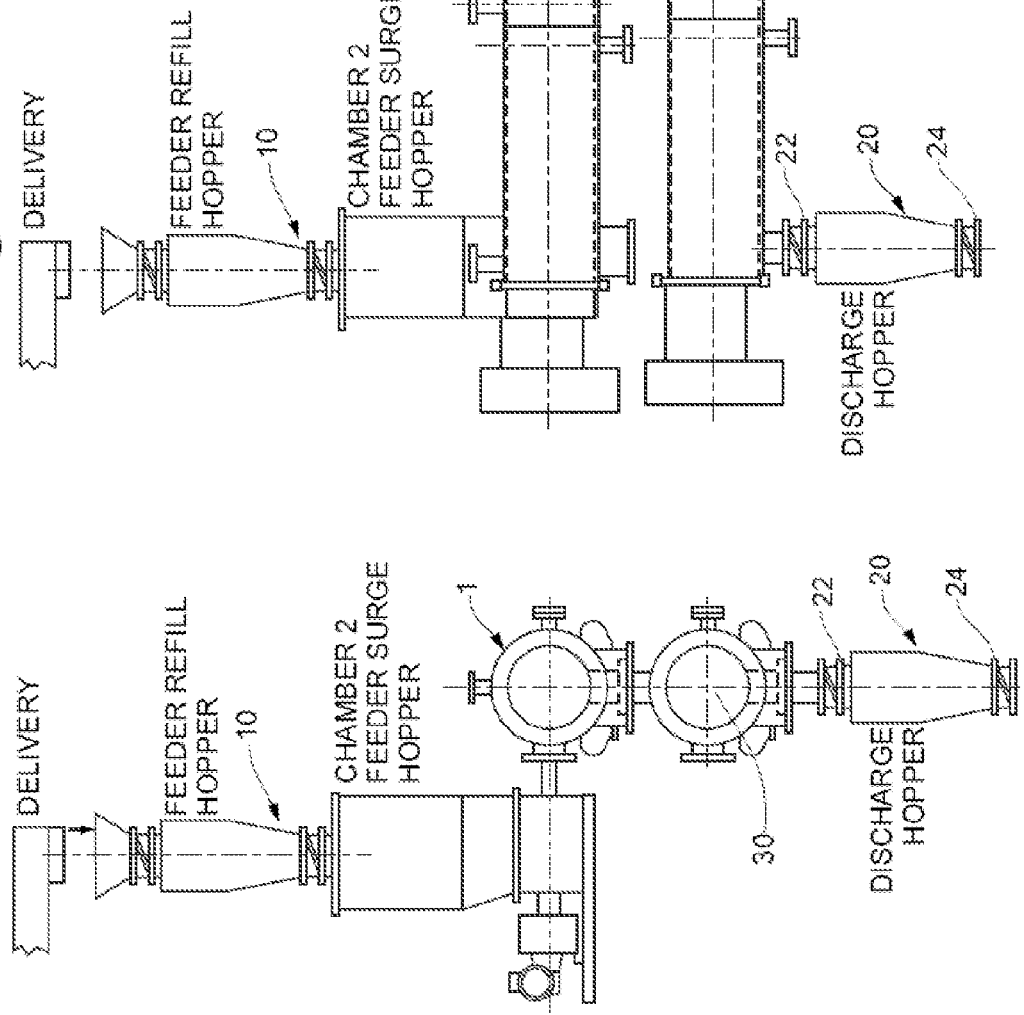

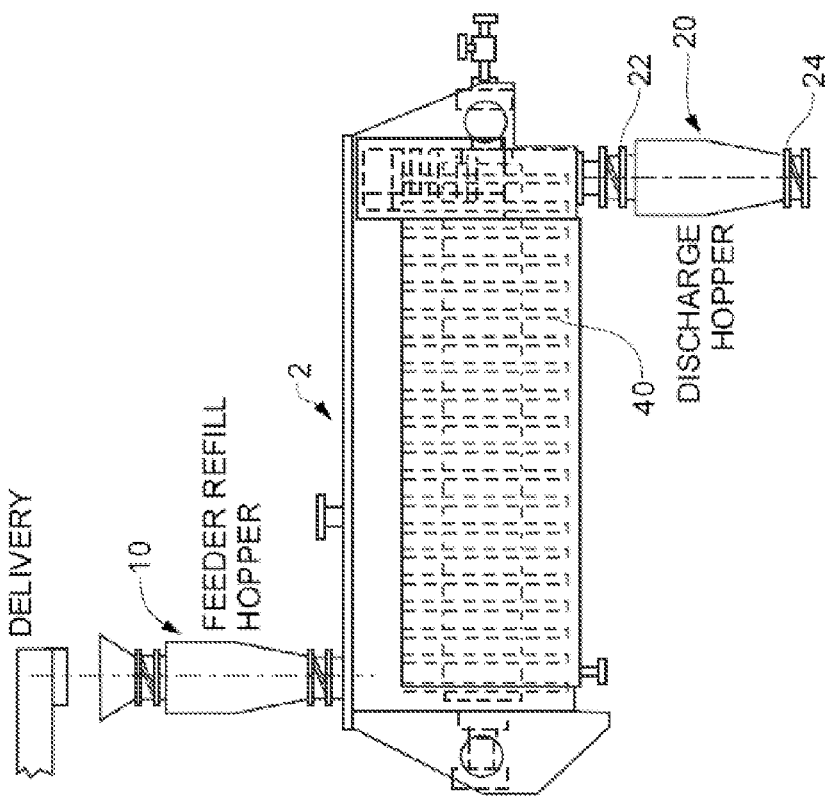
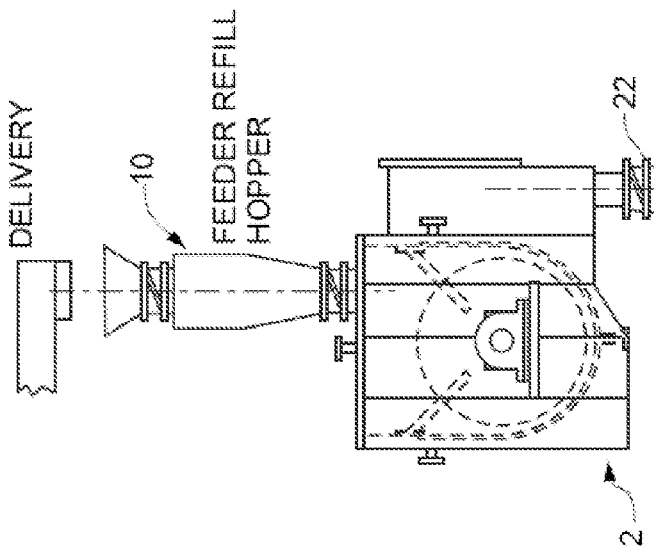

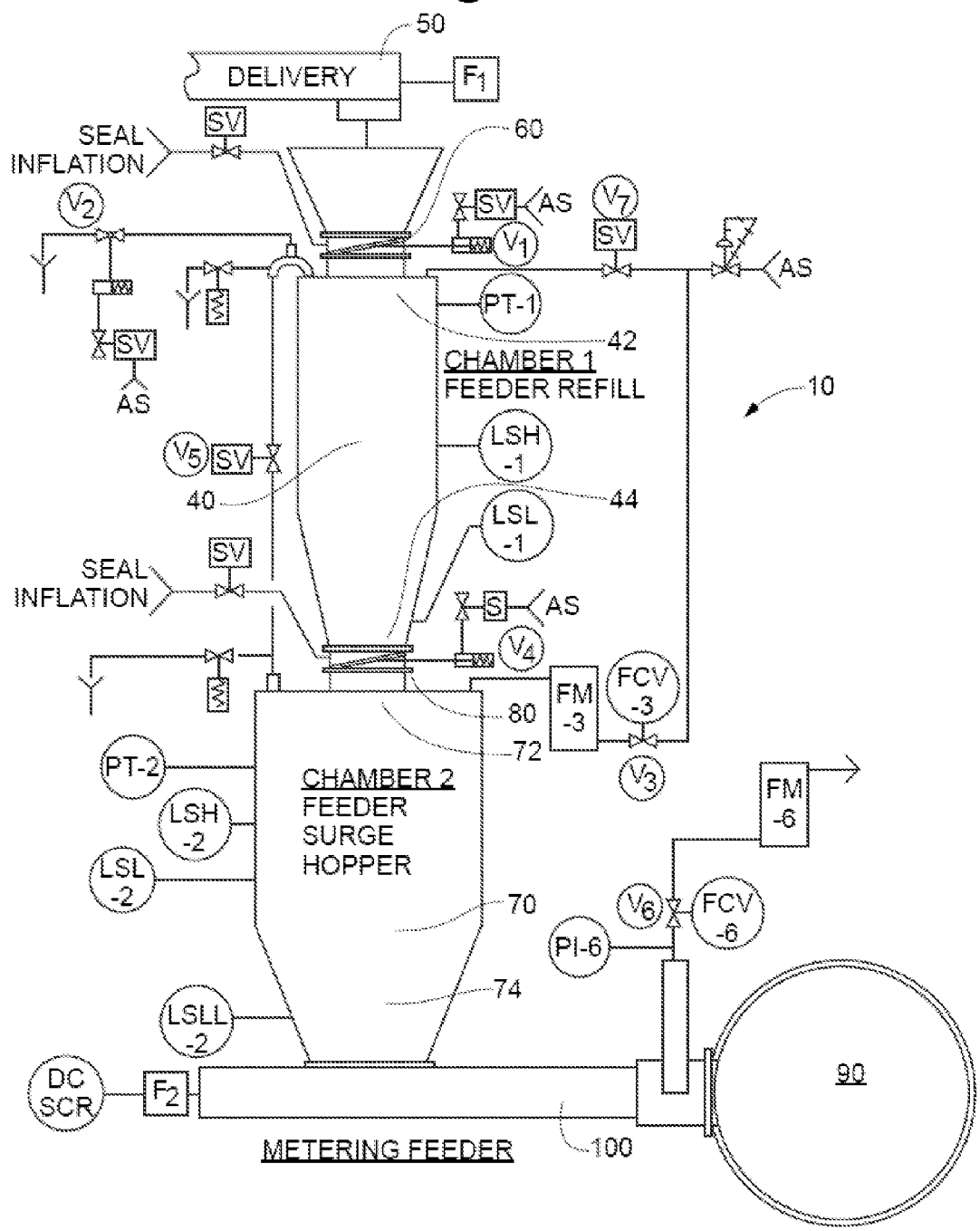

SYSTEM AND METHOD FOR THE CONTINUOUS TREATMENT OF SOLIDS AT NON-ATMOSPHERIC PRESSURE This application claims the benefit of U.S. Provisional Patent Application No. 61/405,844, filed Oct. 22, 2010, the entire content of which is incorporated herein by reference.

TECHNICAL FIELD

This disclosure relates to material processing and, more particularly, to the continuous processing of solid materials at non-atmospheric pressure.

BACKGROUND

Many solid materials may be advantageously treated under pressure or vacuum conditions. Examples of such treatments include pasteurization and drying. Unfortunately, the processing of such solids has generally taken place in discrete batches or has required the use of high pressure delivery mechanisms that expose the solid materials to high shear forces, thereby changing the characteristics of the solid materials.

SUMMARY

Embodiments of the invention allow for continuous processing of solid materials at a non-atmospheric pressure. As described, in some embodiments material is delivered to a process vessel under substantially the same non-atmospheric pressure condition as the process vessel. Further, embodiments of the invention are able to continuously pressure treat solid materials without disrupting the operating pressure of a process vessel.

In one example according to the disclosure, a method for continuously treating a starch-bearing material at a non-atmospheric pressure is described. According to the example, the method includes delivering a starch-bearing material to a hydration control apparatus, at least one of increasing or decreasing an amount of moisture in the starch-bearing material within the hydration control apparatus, and delivering the starch-bearing material from the hydration control apparatus to a material delivery apparatus. The material delivery apparatus including a chamber that defines a feed end and a discharge end, a first valve proximate the feed end of the chamber, and a second valve proximate the discharge end of the chamber. The example specifies that delivering the starch-bearing material to the material delivery apparatus includes delivering the starch-bearing material to the chamber of the material delivery apparatus with the first valve open and the second valve closed. The example method further includes closing the first valve of the material delivery apparatus so as to pressure isolate the starch-bearing material within the chamber of the material delivery apparatus, adjusting a pressure within the chamber of the material delivery apparatus to a non-atmospheric pressure that is substantially equal to a non-atmospheric pressure in a process vessel downstream of the material delivery apparatus, opening the second valve of the material delivery apparatus and delivering the starch-bearing material from the chamber of the material delivery apparatus to the process vessel, and heating the starch-bearing material within the process vessel.

In another example according to the disclosure, a system for continuously treating a starch-bearing material at a non-atmospheric pressure is described. The system includes a hydration control apparatus configured to at least one of increase or decrease an amount of moisture in a starch-bearing material, a process vessel configured to heat the starch-bearing material at a non-atmospheric pressure, the process vessel being positioned downstream of the hydration control apparatus, a dryer configured to decrease the amount of moisture in the starch-bearing material, the dryer being positioned downstream of the process vessel, and a material delivery apparatus positioned between the hydration control apparatus and the process vessel. According to the example, the material delivery apparatus includes a chamber, a first valve positioned between the hydration control apparatus and the chamber, and a second valve positioned between the process vessel and the chamber. The example system also includes a pressure source in pressure communication with the chamber of the material delivery apparatus, the pressure source being configured to adjust a pressure within the chamber so that the pressure is substantially equal to the non-atmospheric pressure in the process vessel.

In another example, a method for continuous treatment of a material containing a solid component at a non-atmospheric pressure is described. The method includes delivering at a substantially atmospheric pressure the material containing the solid component to a first chamber having a feed end and a discharge end, closing a first valve proximate the feed end of the first chamber, and adjusting a pressure of the first chamber to a non-atmospheric pressure substantially equal to a non-atmospheric pressure in a second chamber. According to the example, the second chamber has a feed end and a discharge end, the second chamber is separated from the first chamber by a second valve located proximate the feed end of the second chamber and the discharge end of the first chamber. The example method further includes opening the second valve, delivering the material containing the solid component to the second chamber through the second valve, continuously delivering the material containing the solid component from the second chamber to a process vessel in delivery communication with the second chamber, the process vessel operating at a non-atmospheric pressure, the second chamber being at substantially the same non-atmospheric pressure as the process vessel, and continuously processing the material containing the solid component in the process vessel.

The details of one or more examples are set forth in the accompanying drawings and the description below. Other features, objects, and advantages will be apparent from the description and drawings, and from the claims.

BRIEF DESCRIPTION OF THE DRAWING

FIG. 1A shows an end view of a system in accordance with a first embodiment of the invention.

FIG. 1B shows a side view of a system in accordance with the first embodiment of the invention.

FIG. 2A shows an end view of a system in accordance with a second embodiment of the invention.

FIG. 2B shows a side view of a system in accordance with the second embodiment of the invention.

FIG. 3A shows an end view of a system in accordance with a third embodiment of the invention.

FIG. 3B shows a side view of a system in accordance with the third embodiment of the invention.

FIG. 4 shows a detailed end view of a system in accordance with an embodiment of the invention.

DETAILED DESCRIPTION

Figure 5:
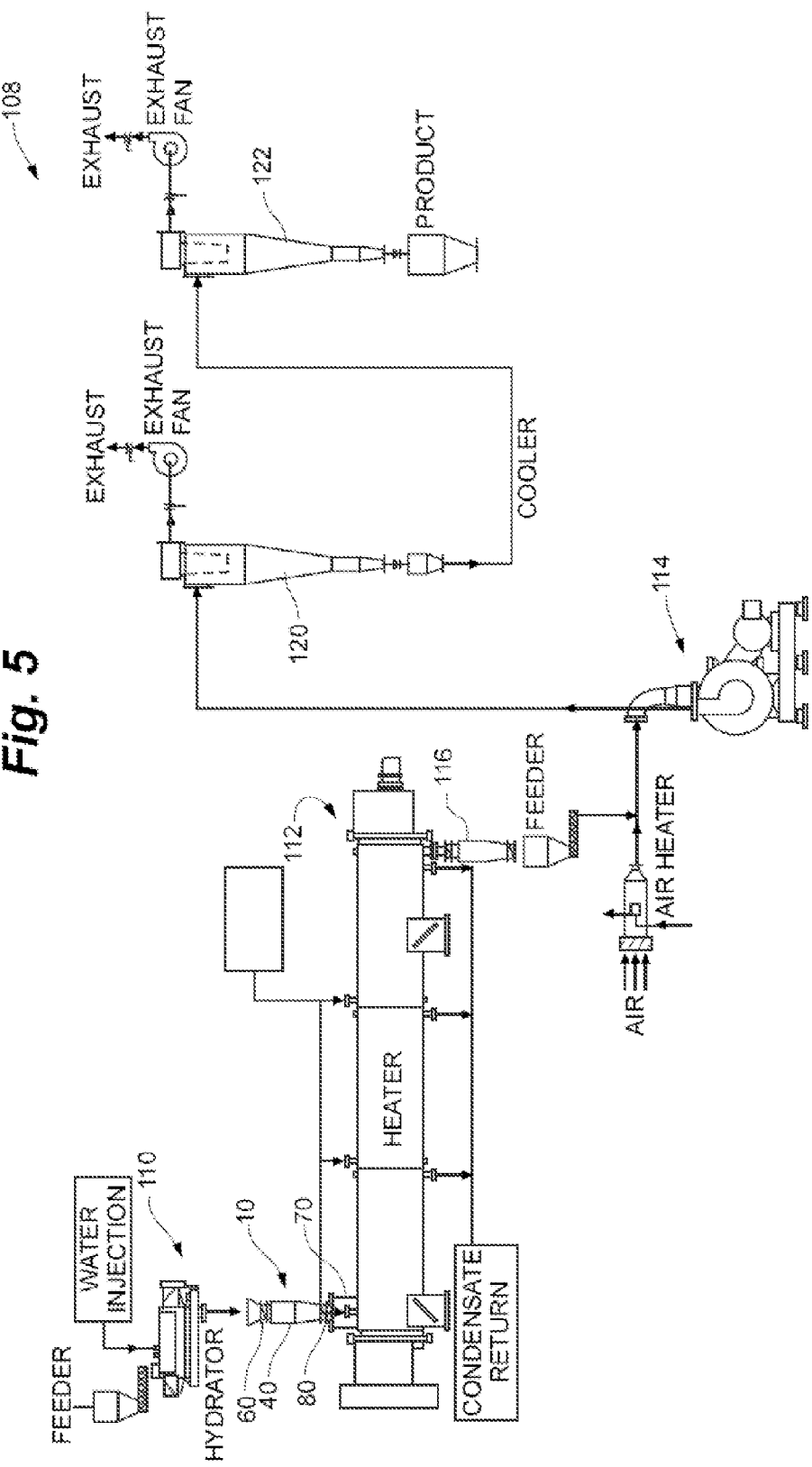
FIG. 5 is a process diagram illustrating an example process in accordance with the disclosure.

Embodiments of the invention include a system and method for the continuous treatment of a material containing a solid component at a non-atmospheric pressure (e.g., between full vacuum and about 100 psig). The material is continuously delivered to a process vessel at substantially the same pressure as the process vessel, e.g., without exposing the material to significant shear stresses or disrupting the operating pressure of the process vessel.

FIGS. 1A-3B show three embodiments of system configurations for the continuous pressure treatment of solids in accordance with the invention. FIGS. 1A and 1B show end and side views, respectively, of a first embodiment. Solid material is continuously fed into the process vessel 1 via a material delivery apparatus 10 and discharged from the process vessel through a discharge hopper 20 having one or more discharge valves 22, 24 to allow for material discharge without disrupting the process pressure. It should be noted that the process vessel may be of any desired type. In some embodiments, the process vessel includes a Solidaire®, TorusDisc®, Thermascrew®, Turbulizer®, or Continuator® dryer from Bepex International, LLC, the assignee of the present application. For example, process vessel 1 may be a disc, paddle, twin rotor, screw, fluid bed, thin layer paddle, thin film paddle, steam tube, rotary, or other mixer or process vessel. Desirable process vessels are also described in U.S. Pat. No. 6,098,307, the contents of which are hereby incorporated by reference. As shown in FIGS. 1A and B, the solids proceed through the process vessel from the material delivery apparatus 10 to the discharge hopper 20 under controlled non-atmospheric pressure for a predetermined residence time to treat the solids. FIGS. 2A and B show the same general configuration as shown in FIGS. 1A and B, except a second process vessel 30 has been added in series to provide for an extended residence time. Second process vessel 30 may be the same as or different than first process vessel 10. In some examples, second process vessel 30 may be a screw vessel, a purge vessel, or a vertical hopper.

FIGS. 3A and 3B show end and side views, respectively, of a second embodiment having a different process vessel for purposes of illustration. Solid material is fed into the process vessel 2 at material delivery apparatus 10 and discharged from the process vessel through discharge hopper 20. In the embodiment of FIGS. 3A and B, the solids are subject to disc agitation and heat transfer from discs 40 as the solids move through the process vessel 2, which provide a longer residence time for treatment.

Embodiments of the invention include a material delivery apparatus 10. This apparatus is sometimes referred to as a "feeder" herein. As shown best in FIG. 4, the apparatus 10 can include a first chamber 40 separated from a material delivery means 50 by a first valve 60. First chamber 40 includes a feed end 42 and a discharge end 44 and provides a volume to hold the material until it is delivered to a second chamber 70 through a second valve 80. Accordingly, material is collected in the first chamber until it is delivered to the second chamber, and the volume of the first chamber is larger than a hypothetical pipe extending between the first and second valves for which the valves are sized. Stated another way, the first chamber may have a diameter larger than the outer diameter of a valve housing that houses the valve (e.g., two or more times larger). The second chamber 70 includes a feed end 72 and a discharge end 74 and provides a volume from which to continuously supply material to be processed to a process vessel 90. As with the first chamber, the diameter of the second chamber can be larger than the outer diameter of a valve housing that houses the valve (e.g., two or more times larger). Accordingly, the system includes at least two pressure controlled and selectively isolatable chambers useful for the continuous delivery of the solid material to the process vessel at a pressure substantially equal to the pressure in the process vessel. In some embodiments, a feed metering mechanism 100 is provided to assist conveyance of the material from the second chamber to the process vessel. In such embodiments, the feed metering mechanism includes a metering motor to drive a metering screw to push the material into the process vessel, e.g., at a controlled and substantially uniform rate. As described further below, by sequential actuation of the first and second valves and adjusting the pressure in the first vessel, solids can be continuously delivered to a process vessel operating at non-atmospheric pressure without imparting shear forces to the material or disrupting the pressure of the process vessel.

The first and second valves can be sequentially operated by an electro-mechanical control system. Further, the first and second valves can be of any suitable type. In some embodiments, the first and/or second valve includes a positive sealing valve to help prevent leakage of process gas out of the system if the system pressure is greater than atmospheric and to help prevent atmospheric gas entry into the system if the system pressure is less than atmospheric. Other examples of suitable valves for the first or second valves include butterfly valves, ball valves, pinch valves, iris valves, dump valves, dome valves, knife gates, single airlocks or rotary valves, double airlocks or rotary valves, and slide gates.

The pressure of the first chamber can be adjusted by any suitable means. In some embodiments, adjusting the pressure of the first chamber to a non-atmospheric pressure includes either pressurizing the first chamber such that its pressure is above atmospheric pressure or drawing a vacuum in the first chamber such that its pressure is below atmospheric pressure. In such embodiments, a positive pressure and/or a vacuum source (e.g., a positive pressure and/or a vacuum pump, a steam generator) can be provided in gas communication with the first chamber to adjust its pressure. Pressure and/or vacuum in such embodiments can be generated by any means. Further, one or more gas discharge valves can be provided to facilitate the pressure adjustment of the first chamber back to atmospheric pressure when desired.

In some embodiments, methods in accordance with the invention comprise delivering at a substantially atmospheric pressure the material containing the solid component to a first chamber having a feed end and a discharge end. The method can include the step of closing a first valve proximate the feed end of the first chamber. Further, the method can include the step of adjusting a pressure of the first chamber to a non-atmospheric pressure substantially equal to a non-atmospheric pressure in a second chamber having a feed end and a discharge end. In some embodiments, the second chamber can be separated from the first chamber by a second valve located proximate the feed end of the second chamber and the discharge end of the first chamber. The second valve can then be opened, and the material can be delivered to the second chamber. Embodiments of the invention also include continuously delivering the material containing the solid component from the second chamber to a process vessel in delivery communication with the second chamber where the second chamber is at substantially the same non-atmospheric pressure as the process vessel. Finally, the material can be continuously processed in the process vessel and discharged through the one or more discharge valves, e.g., in such a way that the process vessel is substantially or completely pressure isolated from any pressure change associated with incoming or outgoing material.

Accordingly, embodiments of the invention allow for continuous processing of solid materials at a non-atmospheric pressure. As described in some embodiments, material is delivered to a process vessel under substantially the same non-atmospheric pressure condition as the process vessel. Further, embodiments of the invention are able to continuously pressure treat solid materials without disrupting the operating pressure of a process vessel.

Some embodiments of the invention achieve these results without imparting significant mechanical force or sheer on the material as it is delivered to the process vessel, thereby avoiding undesired modifications to the material during the delivery process and providing precise control of the final product's characteristics. For example, in the case of starch and starch bearing products, especially those with starch-protein complexes encapsulated within a starch granule, rupture of the granule and degradation of the starch itself can occur if excessive shear is used in a high pressure feed apparatus. This may be especially true if excessive mechanical force or sheer is imparted to a starch or starch bearing product while the product is at an elevated temperature and/or humidity level as compared to an ambient environment. In such embodiments, the first and second chambers can be free or substantially free of compressive forces (e.g., mechanical agitators).

Methods in accordance with embodiments of the invention may also include other desirable sequential openings or closings of the first and second valves. For example, the method may include the step of opening the first valve before the material is delivered to the first chamber. In some embodiments, the method includes the step of closing the second valve after the material has been delivered to the second chamber. In such embodiments, the pressure in the first chamber can be adjusted to a substantially atmospheric pressure or other delivery system pressure (e.g., in instances in which the delivery system is not configured to operate at atmospheric pressure) after the second valve is closed to ready it for another delivery of material after the first valve is opened.

In some embodiments, continuously delivering the material containing the solid component from the second chamber to the process vessel step includes delivering the material from the second chamber to a feed metering mechanism and from the feed metering mechanism to the process vessel. In such embodiments, the feed metering mechanism can be at substantially the same non-atmospheric pressure as the second chamber and the process vessel.

Embodiments of the invention include the continuous pressure processing of any solid material in any form. In some embodiments, the material containing the solid component is in the form of particulate solids, pulverized solids, wetted solids, wet cake, paste or slurry. In certain embodiments, the solid component includes pulses (e.g., beans, peas, lentils), botanicals (e.g., leaves, root, and bark), herbs, spices, flour components (endosperm, bran, and germ), any whole grain, whole grain flour, whole grain meal, any pulse, pulse flour or pulse meal, bran fraction, germ fraction, endosperm fraction, starch powders, or heat sensitive polymers, chemicals, minerals, and foodstuffs. Embodiments of the invention are not limited to any particular feed size, but the size will generally be from whole grain size (e.g., approximately 10 mm) to finely milled micron or submicron sized particles.

In some embodiments, the processing step in the process vessel includes continuous pressure heat treatment. In such embodiments, the material is heat treated in addition to being pressure treated in the process vessel. Heat can be applied to the material by any suitable means, including direct and indirect heating. Generally, heat treatment can take place at between about 100 degrees Celsius and about 170 degrees Celsius at a pressure of more than one atmosphere. Depending on the material being processed, the material may have a moisture content ranging from 0 wt % to greater than 50 wt % (e.g., greater than 75 wt % moisture), when exposed to such temperature and pressure conditions. Examples of continuous pressure heat treatment include one or more of pasteurization, sterilization, enzyme deactivation, starch modification, starch gelatinization, flavor profile, and texture modification. More specific examples of pasteurization or sterilization of botanicals, herbs and spices, includes killing spores, reducing microbial activity, and eliminating pathogens. Enzyme deactivation of whole grains or bran/germ fraction ingredients, rapid modification and gelatinization of starch within whole grain flours, endosperm fraction of grain flours or separated starch powders, and modification of bran fractions by modifying flavor profiles or texture with or without chemical modification are examples commonly referred to as heat treating, cooking, pre-cooking, insantizing, or toasting. Pasteurization may be considered a two log or more reduction (i.e., a two order of magnitude or more reduction) in microorganism count for a material. By contrast, sterilization may be considered to be substantially a complete elimination of microorganisms from a material.

In the case of pasteurization, steam may be directly injected in the materials to nearly instantly heat it to a desired sterilization temperature, thus minimizing required process time. Further, because embodiments of the invention can operate continuously at high pressures, temperatures higher than the atmospheric boiling point can be obtained. Such higher temperatures are useful for the pasteurization of some microorganisms.

In addition, because temperatures higher than the atmospheric boiling point can be obtained without boiling, materials can be exposed to such temperatures without drying via boiling. Such a process is useful for heat treating with higher temperatures where material moisture is desired to be retained.

In certain embodiments, the heat treatment occurs under vacuum or under pressure in the process vessel. Such embodiments are useful for drying heat sensitive polymers, chemicals and foodstuffs. In general, such treatment can take place at temperatures between about 50 degrees Celsius and about 110 degrees Celsius and pressures between about 0.1 to about 0.5 atmospheres. For example, grain, starch, and spices can be dried under vacuum at between about 50 degrees Celsius and about 60 degrees Celsius.

In some embodiments of the invention, the moisture content of the material can also be controlled (e.g., raised or lowered, as desired) prior to or during processing. For example, the moisture content of the material can be controlled with steam addition. In some embodiments, moisture content is adjusted upward by an initial hydration mixing step prior to entry into the process vessel. If steam is used in the process vessel, moisture can also be gained from steam condensation. On the other hand, moisture loss may occur if the material is heated without steam addition and without hydration.

In certain embodiments, vapors containing moisture from the material can be separated from the solids in the material before or during processing. As desired, these vapors can be reintroduced to the solids, in a condensed or uncondensed form, during or after processing. It may be desirable to reintroduce such vapors when product moisture is desirable and/or when the vapors will provide desirable flavors or textures to the product. In other processes, it may be desirable to discard the vapors, such as when low product moisture is desired, the vapors contain undesirable vapors, and/or when the vapors would negatively affect product texture or flavor.

As described herein, embodiments of the material delivery apparatus allow solid materials to be continuously delivered to a process vessel under non-atmospheric pressure. In some embodiments, the material is continuously delivered to the process vessel without exposing the material to shear stresses or disrupting the pressure of a process vessel.

FIG. 5 illustrates an example process 108 implementing a material delivery apparatus as described herein. In the example of FIG. 5, process 108 includes a hydration control apparatus 110, a process vessel 112, and a dryer 114. In addition, process 108 includes previously-described material delivery apparatus 10. In operation, a solid material can be continuously fed into hydration control apparatus 110, which is configured to adjust (e.g., increase and/or decrease) the water content in the solid material. The solid material discharges hydration control apparatus 110 and enters process vessel 112 via material delivery apparatus 10. The solid material may be heated or otherwise processed in process vessel 112. After proceeding through process vessel 112, the solid material can be discharged to dryer 114, which is configured to dry the solid material (e.g., reduce the moisture content of the solid material) for transportation, storage, or further processing.

Process 108 may be useful for processing a variety of different solid materials, as described above. As examples, process 108 may be used to process a starch-bearing material such as, e.g., bran, corn, wheat, oats, or the like. In such examples, the starch-bearing material can be processed to adjust the moisture content of the material and/or to expose the material to temperatures other than ambient temperature. Process 108 may be configured to pasteurize the starch-bearing material (e.g., by killing germ spores within the starch-bearing material), sterilize the starch-bearing material, deactivate enzymes within the starch-bearing material (e.g., by converting fats within the material to fatty acids), chemically modify the starch component within the material, gelatinize the starch within the material, and/or modify the texture of the starch-bearing material. Process 108 may modify the starch-bearing material through the application of pressure, temperature, and/or moisture. In some examples, process 108 can chemically modify or react the starch-bearing material. Chemical modification may involve polymerization, cross linking, depolymerization, denaturing, or the like of the nature starch-bearing material. Chemical reaction may involve reacting the natural starch-bearing material with one or more additional components (e.g., besides water).

In general, hydration control apparatus 110, process vessel 112, and dryer 114 in the example of FIG. 5 are representative of the various structure features and components that enable a solid material to be processed so as to adjust the moisture content of the solid material and to expose the solid material to temperatures other than ambient temperature. Although hydration control apparatus 110, process vessel 112, and dryer 114 are illustrated in FIG. 5 as being separate from one another, it is contemplated that certain structural features and components may be implemented together to perform the functions attributed to process 108.

In the example of FIG. 5, a material (which for ease of description will be referred to as a starch-bearing material) is fed into hydration control apparatus 110 at the beginning of process 108. In some examples, hydration control apparatus is configured to reduce the moisture content of the starch-bearing material, e.g., by heating the material to evaporate moisture. In other examples, hydration control apparatus 110 is configured to increase the moisture content of the starch-bearing material, e.g., to prepare the starch-bearing material for processing on process vessel 112. The added moisture may vaporize during heating in process vessel 112, e.g., to cook, pasteurize, deactivate enzymes, or otherwise modify the starch-bearing material. When so configured, hydration control apparatus 110 may receive water (e.g., liquid water and/or steam) and contact the water with the starch-bearing material to increase the moisture content of the material. Hydration control apparatus 110 may also receive other liquid and/or solid materials in addition to or in lieu of water so as to contact the materials with the starch-bearing material prior to process vessel 112.

In examples in which hydration control apparatus 110 is configured to increase the moisture content of the starch-bearing material, the hydration control apparatus may be implemented as mixer (e.g., a low shear paddle mixer, a high speed paddle mixer, a ribbon mixer, mixing screws), although other types of equipment are also possible. In some examples, hydration control apparatus 110 is temperature controlled, e.g., via a housing with a thermal jacket. Depending on the configuration of process 108, hydration control apparatus 110 may receive a starch-bearing material that has a moisture content less than 14 wt % (e.g., ranging from approximately 5 wt % to approximately 13 wt %) and discharge a starch-bearing material that has a moisture content greater than 14 wt % such as, e.g., a moisture content greater than 30 wt %, or a moisture content ranging from 14 wt % to 55 wt %.

In the example of FIG. 5, the starch-bearing material is discharged from hydration control apparatus 110 and received by process vessel 112. In some applications, hydration control apparatus 110 is operated at a different pressure than process vessel 112. For example, hydration control apparatus 110 may be operated at atmospheric pressure while process vessel 112 may be operated at a pressure above or below atmospheric pressure. Alternatively, hydration control apparatus 110 may be operated at a pressure above or below atmospheric pressure while process vessel 112 is operated at atmospheric pressure. In still another example, hydration control apparatus 110 and process vessel 112 may both be operated at a non-atmospheric pressure, where the pressure of the hydration control apparatus is different than the pressure of the process vessel. In any example, process 108 may include material delivery apparatus 10 for adjusting the pressure of the starch-bearing material between hydration control apparatus 110 and process vessel 112.

Material delivery apparatus 10 in the example of FIG. 5 includes a chamber 40, a first valve 60, and a second valve 80, as described above. Chamber 40 may be a pressure equalization chamber positioned between hydration control apparatus 110 and process vessel 112. In operation, the starch-bearing material may be discharged into material delivery apparatus 10 from hydration control apparatus 110 by opening first valve 60 while second valve 80 is closed. After introducing a suitable amount of the starch-bearing material into chamber 40, first valve 60 can be closed to define a chamber that is pressure isolated from hydration control apparatus 110 and process vessel 112. Chamber 40 may initially be at the same pressure as hydration control apparatus 110. Subsequently, a positive pressure and/or vacuum source in fluid communication chamber 40 can be activated to adjust the pressure of the chamber (e.g., increase and/or decrease the pressure in the chamber) until the pressure in the chamber is substantially equal to the pressure in process vessel 112. Thereafter, second valve 80 can be opened while first valve 60 is closed to discharge the contents of material delivery apparatus 10 into process vessel 112.

To repeat the process, second valve 80 of material delivery apparatus 10 can be closed after discharging the contents of the delivery apparatus while first valve 60 remains closed. Chamber 40 may initially be at the same pressure as process vessel 112. Subsequently, a positive pressure and/or vacuum source in fluid communication chamber 40 can be activated to adjust the pressure of the chamber (e.g., increase and/or decrease the pressure in the chamber) until the pressure in the chamber is substantially equal to the pressure in hydration control apparatus 110. Thereafter, first valve 60 can be opened to again fill chamber 40 for conveying additional material to process vessel 112. In this manner, the starch-bearing material can be conveyed from a first pressure associated with hydration control apparatus 110 to a second pressure associated with process vessel 112 without pressure shocking the material in such a way that can shear or otherwise damage the starch-bearing material.

Process 108 includes process vessel 112. Process vessel 112 may include any of the example types of process vessels described above with respect to FIGS. 1A-3B. In one example, process vessel 112 is configured to heat the starch-bearing material within the vessel. Process vessel 112 may be configured to indirectly heat the starch-bearing material (e.g., via a jacketed vessel that receives steam or another thermal transfer fluid) and/or directly heat the starch-bearing material. When process vessel 112 is configured to directly heat the starch-bearing material, the vessel may receive steam or another heated medium (e.g., heated air) that directly contacts the starch-bearing material in the vessel. In some examples, process vessel 112 is also configured to agitate the starch-bearing material within the vessel. Agitation may increase the rate at which heat transfers into the starch-bearing material during operation.

Process vessel 112 may be operated at any suitable temperature and pressure conditions and the pressure and temperature conditions may vary, e.g., based on the type of material processed in the vessel. Further, the starch-bearing material may be processed in the process vessel at the given temperature and pressure conditions for any suitable length of time. In the example of a starch-bearing material that is being pasteurized, for instance, process vessel 112 may be operated at a pressure greater than 5 psig such as, e.g., a pressure greater than 15 psig, a pressure greater than 20 psig, or a pressure ranging from approximately 15 psig to approximately 25 psig, and a temperature greater than 100 degrees F. such as, e.g., a temperature greater than 250 degrees F., or a temperature ranging from approximately 200 degrees F. to approximately 400 degrees F. The starch-bearing material may be exposed to the temperature and pressure conditions for at least 3 seconds such as, e.g., at least 1 minute, at least 5 minutes, at least 30 minutes, or a period ranging from approximately 10 minutes to approximately 30 minutes. Stated differently, the starch-bearing material may have a residence time within process vessel 112 ranging from approximately 10 minutes to approximately 30 minutes. It should be appreciated that the foregoing temperature, pressure, and residence time values are merely examples, and the disclosure is not limited in this respect.

For example, in instances in which the starch-bearing material is being processed in processed vessel 112 for enzyme deactivation, the pressure vessel may be operated at a pressure greater than 3 psig such as, e.g., a pressure greater than 8 psig, a pressure greater than 10 psig, or a pressure ranging from approximately 7.5 psig to approximately 12 psig, and a temperature greater than 100 degrees F. such as, e.g., a temperature greater than 200 degrees F., or a temperature ranging from approximately 200 degrees F. to approximately 300 degrees F. The starch-bearing material may be exposed to the temperature and pressure conditions in such an application for a period of at least 3 seconds such as, e.g., at least 1 minute, at least 5 minutes, or a period ranging from approximately 5 seconds to approximately 60 seconds.

Process vessel 112 receives the starch-bearing material from hydration control apparatus 110 via material delivery apparatus 10. In some examples, as described above and as illustrated in FIG. 5, material delivery apparatus 10 includes a second chamber 70 positioned between the discharge end of second valve 80 and process vessel 112. Second chamber 70 may be configured to receive the starch-bearing material from material delivery apparatus 10 and to hold the material before processing in process vessel 112. The hold up volume of material stored in second chamber 70 may help ensure that process vessel 112 operates continuously without waiting for material from hydration control apparatus 110.

When material delivery apparatus 10 is configured with second chamber 70, the chamber may store any suitable volume of starch-bearing material. In some examples, second chamber 70 of material delivery apparatus 10 is configured to store a sufficient volume of starch-bearing material such that the starch-bearing material substantially blocks fluid communication between material delivery apparatus 10 and process vessel 112. For example, in instances in which steam is injected into process vessel 112, the starch-bearing material stored within second chamber 70 may substantially prevent the steam injected in the process vessel 112 from communicating back to the outlet of second valve 80 of material delivery apparatus 10. That is, the environment at the outlet of second valve 80 of material delivery apparatus 10 may be substantially isolated from the environment in process vessel 112. Preventing steam from migrating from process vessel 112 to the outlet second valve 80 of material delivery apparatus 10 may be useful in instances in which there is a temperature differential between the process vessel and the material delivery apparatus. For example, when the environment at the outlet of second valve 80 is cooler than the environment in process vessel 112, the steam from the process vessel may condense if the steam travels to the outlet of the second valve. This may cause different particles of the starch-bearing material to agglomerate, potentially causing plugging or other operational problems. Having different gas compositions between the environment at the outlet of second valve 80 and the environment in process vessel 112 may be beneficial for other reasons as well.

Process vessel 112 can be implemented using a variety of different pieces of equipment or combinations of pieces of equipment. In different examples, process vessel 112 may be a paddle dryer (e.g., a thin layer paddle dryer), an indirect dryer, a rotary disc-type dryer, a steam tube dryer, a rotary dryer, a fluid bed dryer, and/or a purge column.

In operation, process vessel 112 receives the starch-bearing material at a receiving end and discharges that material at a discharge end. In the example of FIG. 5, the discharge end of process vessel 112 is identified by reference numeral 116. In applications where process vessel 112 is operated at a different pressure than the pressure of downstream operations in process 108, a material delivery apparatus 10 may be positioned at the discharge end 116 of the process vessel. The material delivery apparatus at the discharge end 116 of process vessel 112 can be used to adjust the pressure of the starch-bearing material (e.g., increase or decrease the pressure of the starch-bearing material) from the pressure in the process vessel to the pressure downstream of the process vessel. In this manner, the starch-bearing material can be conveyed from process vessel 112 to a downstream process without pressure shocking the material in such a way that can shear or otherwise damage the starch-bearing material.

When process 108 includes a material delivery apparatus 10 positioned downstream of process vessel 112 (which may or may not also have a material delivery apparatus 10 positioned upstream of the process vessel) the apparatus may include a chamber 40, a first valve 60, and a second valve 80, as described above. In operation, the starch-bearing material may be discharged into material delivery apparatus 10 from process vessel 112 by opening first valve 60 while second valve 80 is closed. After introducing a suitable amount of the starch-bearing material into chamber 40, first valve 60 can be closed to define a chamber that is pressure isolated from process vessel 112. Chamber 40 may initially be at the same pressure as process vessel 112. Subsequently, a positive pressure and/or vacuum source in fluid communication chamber 40 can be activated to adjust the pressure of the chamber (e.g., increase and/or decrease the pressure in the chamber) until the pressure in the chamber is substantially equal to the pressure downstream process vessel 112. Thereafter, second valve 80 can be opened while first valve 60 is closed to discharge the contents of material delivery apparatus 10 downstream of process vessel 112. Alternatively, second valve 80 may be opened while first valve 60 is closed without first equalizing the pressure in chamber 40 with the pressure downstream of process vessel 112. A pressure differential between the process vessel and the downstream process may force starch-bearing material in the process vessel out to the downstream process upon opening the valve. In either case, starch-bearing material can be discharged from material delivery apparatus 10 without altering the operating pressure within process vessel 112.

To repeat the process, second valve 80 of material delivery apparatus 10 can be closed after discharging the contents of the delivery apparatus while first valve 60 remains closed. Chamber 40 may initially be at the same pressure as the downstream process. Subsequently, a positive pressure and/or vacuum source in fluid communication chamber 40 can be activated to adjust the pressure of the chamber (e.g., increase and/or decrease the pressure in the chamber) until the pressure in the chamber is substantially equal to the pressure in process vessel 112. In examples in which pressure in process vessel 112 is elevated compared to the downstream process, pressure in chamber 40 may be increased to process vessel pressure by injecting steam, compressed air, or the like into the chamber. Thereafter, first valve 60 can be opened to again fill chamber 40 for conveying additional material out of process vessel 112.

Process 108 in the example of FIG. 5 includes dryer 114. Dryer 114 is configured to receive the thermally processed starch-bearing material from process vessel 112 and to dry the material by evaporating moisture in the material. Dryer 114 can include any type of process equipment that directly and/or indirectly heats the starch-bearing material to evaporate water in the material. In some examples, dryer 114 is operated at atmospheric pressure, although in other examples dryer 114 is operated at a non-atmospheric pressure. In one example, dryer 114 is a dispersion-flash dryer. A dispersion-flash dryer may be configured to mechanically disperse a thermally processed starch-bearing material received from process vessel 112 while mixing the starch-bearing material with hot air. Other example types of dryers for dryer 114 include a flash dryer, a fluid bed dryer, a rotary dryer, and the like.

In instances in which process 108 includes a dryer, the dryer may dry the starch-bearing material to any acceptable moisture content. The moisture content may vary, e.g., depending on the type of material being processed. In some examples, the starch-bearing material is dried via dryer 114 to a moisture content less than 20 wt % water such as, e.g., a moisture content less than 14 wt % water, or a moisture content less than 10 wt % water. Drying the starch-bearing material may help de-agglomerate the material and may help reduce or eliminate agglomeration of the material during subsequent transportation, storage, or processing.

Starch-bearing material exits dryer 114 in the example of process 108. The starch-bearing material may be conveyed through a cyclone 120 (FIG. 5) to separate the starch-bearing material from air or other heated gas used to dry the material at dryer 114. Thereafter, the dried and separated starch-bearing material can be sent storage, transport, or further processing as desired.

In the example of FIG. 5, starch-bearing material exiting dryer 114 and cyclone 120 is processed in cooler 122. Cooler 122 is configured to reduce the temperature of the starch-bearing material. Cooling the starch-bearing material after process vessel 112 (and, in some examples, after dryer 114 and/or cyclone 120) can stop or slow any cooking of the starch-bearing material that may be occurring. In addition, cooling the starch-bearing material can modify the rheology and crystallization of the starch-bearing material for subsequent use. In some examples, cooler 122 is configured to cool the starch-bearing material to a temperature less than 100 degrees F. such as, e.g., a temperature less than 90 degrees F., or a temperature less than 80 degrees F., although other temperatures are also contemplated.

While embodiments of the invention have been described in conjunction with specific embodiments thereof, it is evident that many alternatives, modifications, and variations will be apparent to those skilled in the art in light of the foregoing description. Accordingly, it is intended to embrace all such alternatives, modifications, and variations, which fall within the spirit and broad scope of the invention.

The following examples may provide additional details about solids treated in accordance with the disclosure.

EXAMPLES

Example 1

Three different starch-bearing materials were passed through a process as illustrated in FIG. 5. The first starch-bearing material was a whole kernel corn. The second and third starch-bearing material were freshly milled corn flour. In all cases, the starch-bearing materials were hydrated to 30 wt % water in a hydration control apparatus and then heated and agitated in a process vessel. While being heated and agitated in the process vessel, steam equal to between 10 wt % and 15 wt % of the starch-bearing feed materials (i.e., not including the weight of water added in the hydration control apparatus) was injected into the process control vessel. The starch-bearing materials were dried and cooled downstream of the process vessel.

The first starch-bearing material (i.e., the whole kernel corn) and the second starch-bearing material (i.e., one of the freshly milled corn flour samples) were treated under identical temperature and pressure conditions while being processed. Further, the process vessel in these examples was operated at a positive pressure of greater than 5 psig. The third starch-bearing material (i.e., the other freshly milled corn flour sample) was treated under the same temperature conditions as the first two samples but different pressure conditions. Specifically, for the third starch-bearing material, the process vessel was operated at atmospheric pressure.

After being processed as described above, RVA profiles for each of the three starch-bearing materials were generated using a Perten Instruments RVA 4500. The RVA profiles measured the cook characteristics of the starch-bearing material. Two RVA profiles were generated for each of the three starch-bearing materials. The first RVA profile was generated by mixing 4 grams of the processed starch-bearing material with 25 grams of water and placing the mixture in the RVA instrument under the following operating conditions:

| Time (mm:ss) | Temp (° C.) | Impeller Speed (RPM) |
|---|---|---|
| 0:00 | 25 | 960 |
| 0:10 | 25 | 160 |
| 2:00 | 25 | 160 |
| 7:00 | 95 | 160 |
| 10:00 | 95 | 160 |
| 15:00 | 50 | 160 |
| 22:00 | End | |

The second RVA profile was generated by mixing 6.88 grams of the processed starch-bearing material with 25 grams of water and placing the mixture in the RVA instrument under the following operating conditions:

| Time (mm:ss) | Temp (° C.) | Impeller Speed (RPM) |
|---|---|---|
| 0:00 | 25 | 960 |
| 0:10 | 25 | 160 |
| 6:00 | 25 | 160 |
| 11:30 | 65 | 160 |
| 15:00 | End | |

Figure 6:
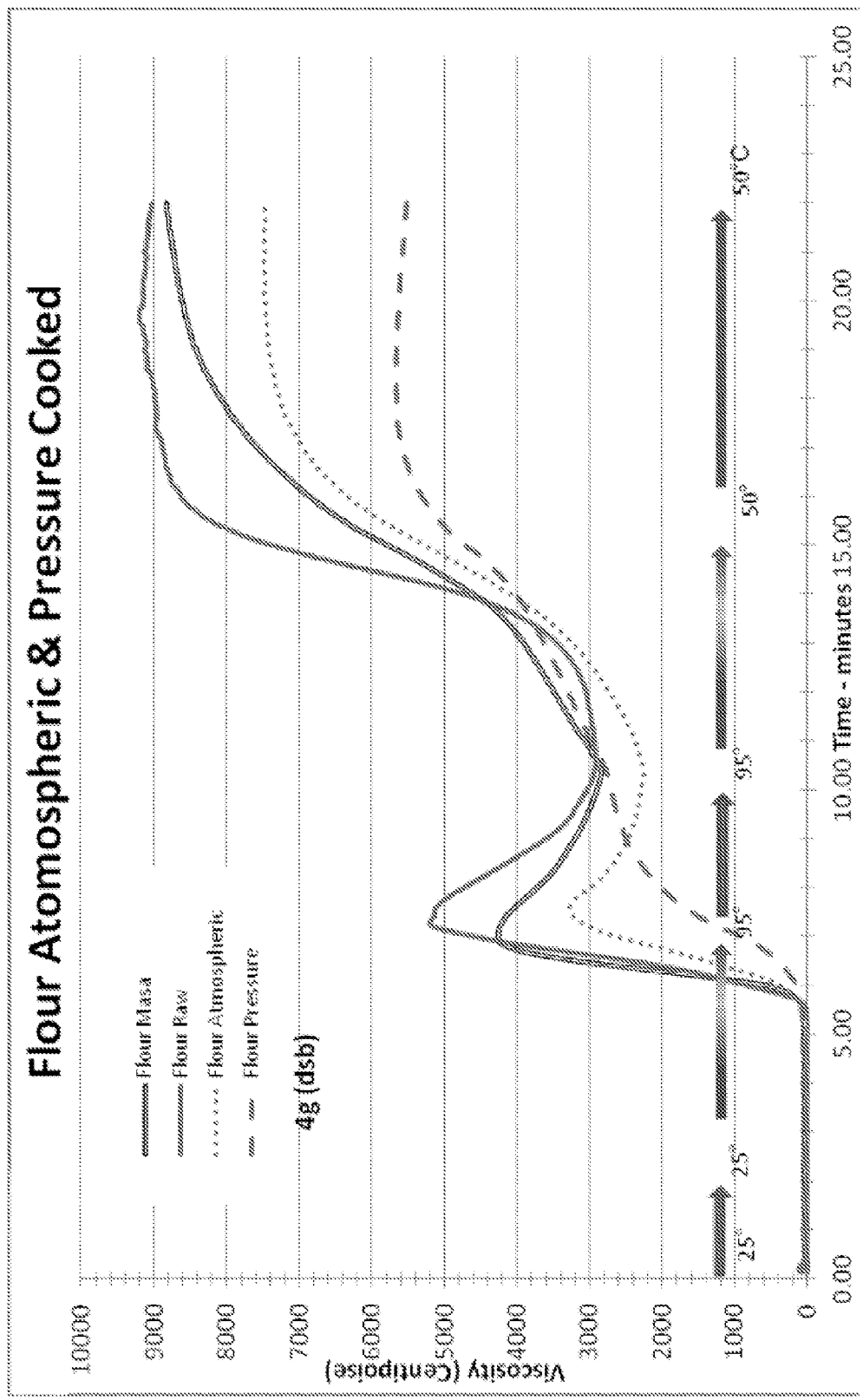
FIG. 6 is a plot of example RVA profiles generated using a first set of RVA instrument operating conditions for two example milled flour samples.
Figure 7:
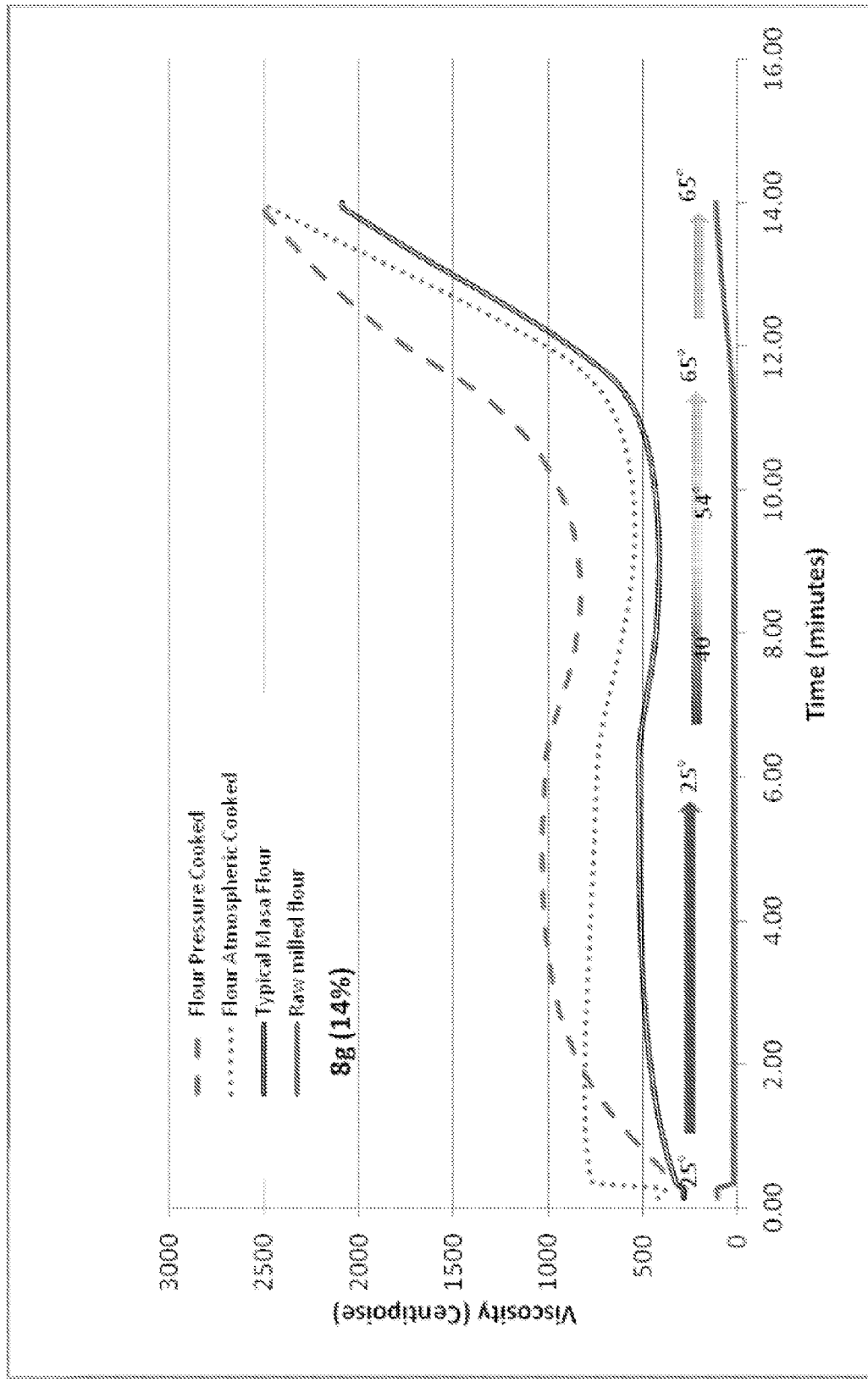
FIG. 7 is a plot of example RVA profiles generated using a second set of RVA instrument operating conditions for the two example milled flour samples of FIG. 6.

RVA profiles for the two milled flour samples (one of which was processed under positive pressure conditions and one of which was processed at atmospheric conditions) are plotted on FIGS. 6 and 7. FIG. 6 plots RVA profiles generated using the first set of RVA instrument operating conditions listed above for the two milled flour samples. FIG. 7 plots RVA profiles generated using the second set of RVA instrument operating conditions listed above for the two milled flour samples. FIGS. 6 and 7 also plot RVA profiles for two comparison starch-bearing materials. The first comparison starch-bearing material is a raw freshly milled corn flour that was not passed through a process as illustrated in FIG. 5. The second comparison starch-bearing material is a typical masa flour.

From FIGS. 6 and 7, it is evident that the pressure and heat treated flour sample is far more cooked than another of the other samples. The pressure and heat treated flour sample exhibits a minimal raw peak and very high level of absorption (e.g., in FIG. 7). Although not evident on the figures, it should also be noted that the process rate (in mass/time) for the pressure and heat treated flour sample was more than twice the process rate for the atmospheric and heat treated sample.

Figure 8:
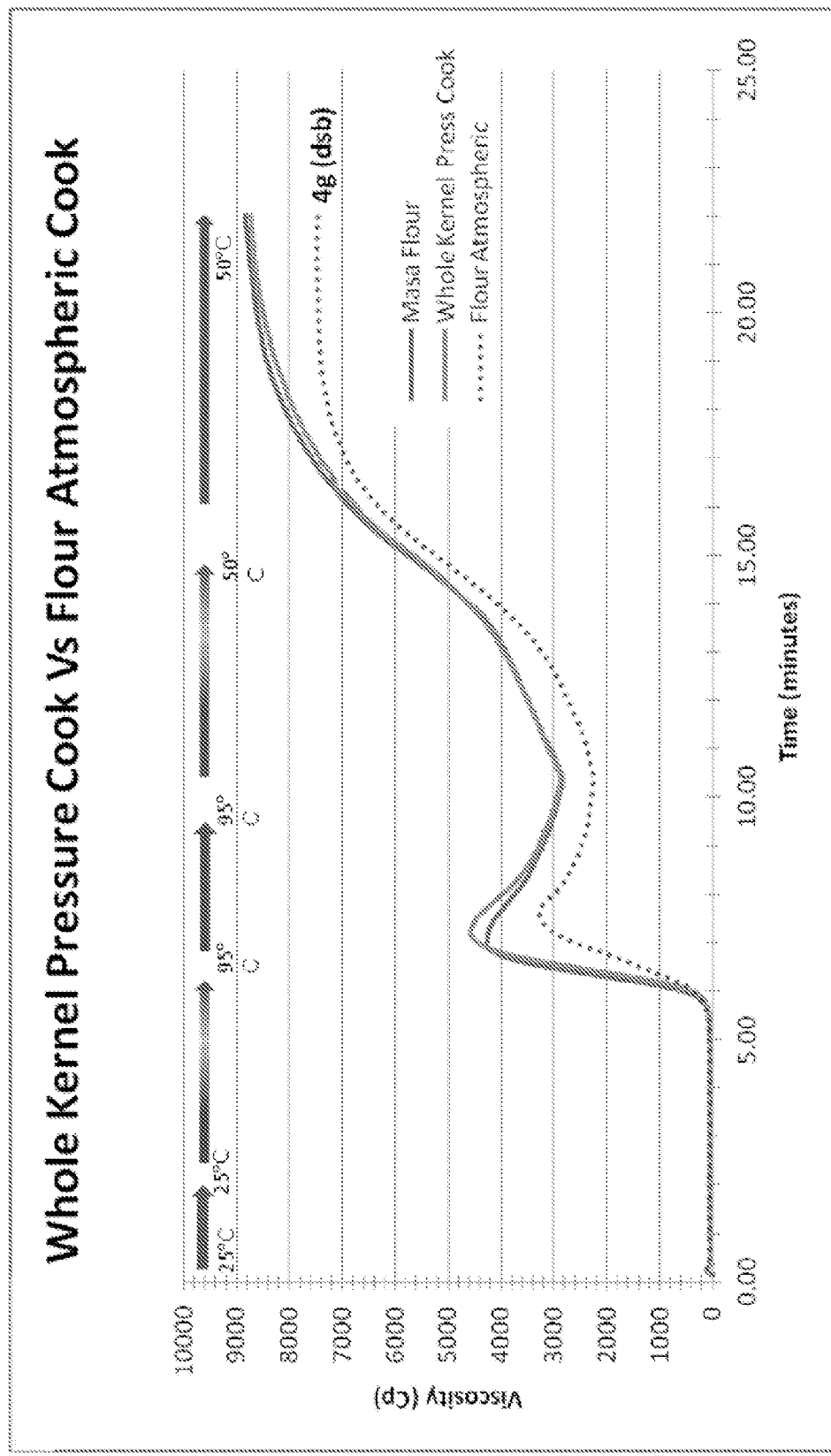
FIG. 8 is a plot of example RVA profiles generated using a first set of RVA instrument operating conditions for an example whole kernel corn sample and an example milled flour sample.
Figure 9:
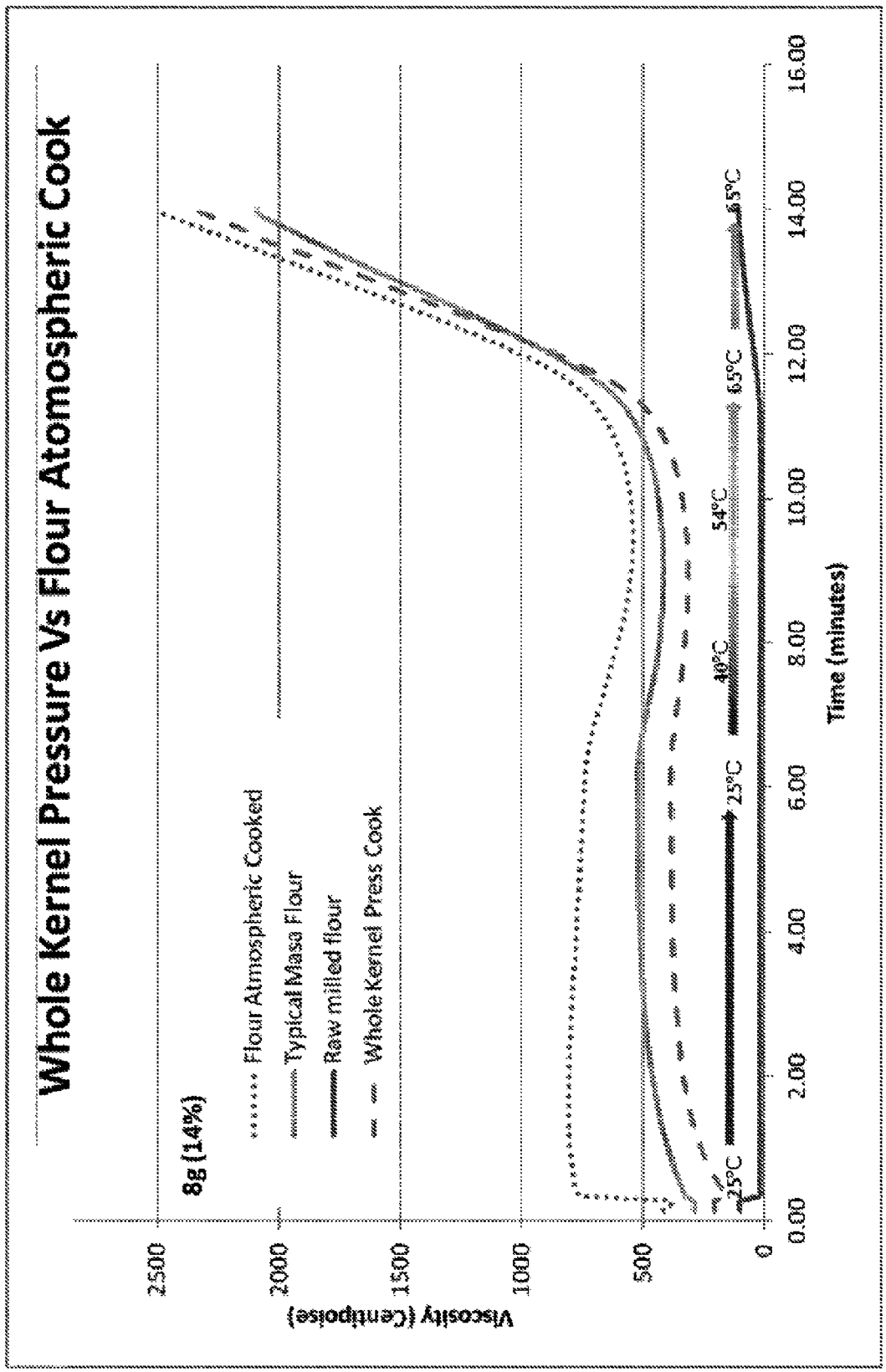
FIG. 9 is a plot of example RVA profiles generated using a second set of RVA instrument operating conditions for the example whole kernel corn sample and the example milled flour sample of FIG. 8.

RVA profiles for the whole kernel corn sample on that milled flour sample processed at atmospheric pressure conditions are plotted on FIGS. 8 and 9. FIG. 8 plots RVA profiles generated using the first set of RVA instrument operating conditions listed above for the two flour samples. FIG. 9 plots RVA profiles generated using the second set of RVA instrument operating conditions listed above for the two flour samples. FIGS. 8 and 9 also plot an RVA profile for one comparison starch-bearing material: a typical masa flour.

Specific run conditions and results are tabulated in the following table.

| Sample Description | Feed Rate (lb/hr) | Hydrate % Moist | Steam Inj (%) FR | SA Prod Temp (F.) | d50 (μ) | d90 (μ) | RVA - First Operating Conditions Peak Vis | Hold |
|---|---|---|---|---|---|---|---|---|
| Milled Raw Flour | — | — | — | — | 100 | 375 | 5053 | 2888 |
| Milled Flour - Atmospheric cook | 300 | 35.4% | 13.2% | 713 | 100 | 375 | 3274 | 2258 |
| Milled Flour - Pressure cook | 600 | 25.7% | 0% | 242 | 207 | 490 | 2685 | 2697 |
| Whole Kernel Corn - Pressure cook(11) | 600 | 29.5% | 0% | 259 | 105 | 440 | 4371 | 2944 |
| Masa Flour - store shelf | — | — | — | — | — | — | 4269 | 2843 |

-continued

| Sample Description | RVA - First Operating Conditions | | RVA - Second Operating Conditions | | | |
|---|---|---|---|---|---|---|
| | Break down | Set back | V(3) | V(6) | V(3)-V(6) | V(12) |
| Milled Raw Flour | 43% | 6350 | 21 | 20 | −0.5 | 35 |
| Milled Flour - Atmospheric cook | 31% | 5214 | 791 | 741 | −50 | 1012 |
| Milled Flour - Pressure cook | 0% | 2718 | 835 | 897 | 62 | 1617 |
| Whole Kernel Corn - Pressure cook(11) | 33% | 5720 | 503 | 571 | 68 | 1279 |
| Masa Flour - store shelf | 33% | 5984 | 496 | 521 | 25 | 884 |

From the data above, it is evident that the level of cook is advanced by the use of pressure, even at reduced moisture content, as compared to processing the starch-bearing material at atmospheric pressure. The cook level reached using corn flour may not be possible without maintaining the appropriate higher temperature and moisture content within the process vessel. This combination may only be by controlling the working pressure in the process vessel.

Example 2

Three different samples of wheat bran were passed through a process as illustrated in FIG. 5 to explore enzyme deactivation capabilities. The three samples of wheat bran exhibited the following peroxidase enzyme activity before being passed through the process:

| Description | Peroxidase (Units/g) |
|---|---|
| Sample 1 | 7.62 |
| Sample 2 | 7.95 |
| Sample 3 | 0.35 |

The samples were processed at the following operating conditions:

| Sample | | 1 | 2 | 3 |
|---|---|---|---|---|
| Feed Type | | Wheat Bran - I | Wheat Bran - I | Wheat Bran -II |
| Moisture Wt (%) | Inlet of process vessel | 37 | 18 | 10 |
| | Outlet of process vessel | 51 | 25 | 12 |
| Feed Rate (lb/hr) | | 100 | 130 | 190 |
| Bran Temp (° F.) Outlet of process vessel | | 260 | 256 | 253 |
| Operating Pressure (psig) of process vessel | | 20 | 14 | 15 |

The samples exhibited the following peroxidase enzyme activity after being passed through the process:

| Description | Peroxidase (Units/g) |
|---|---|
| Sample 1 | <0.05 |
| Sample 2 | <0.05 |
| Sample 3 | <0.01 |

The results indicate the process reduced peroxidase enzyme activity in the samples to below detectable levels. Peroxidase enzyme activity is an indicator for enzyme activity that is responsible for release of free fatty acids. Free fatty acids oxidize readily resulting in rancidity and reduced shelf life for a starch-bearing product.

What is claimed is:

1. A method for continuously treating a starch-bearing material at a non-atmospheric pressure, the method comprising:
    delivering a starch-bearing material to a hydration control apparatus;
    at least one of increasing or decreasing an amount of moisture in the starch-bearing material within the hydration control apparatus;
    delivering the starch-bearing material from the hydration control apparatus to a material delivery apparatus, the material delivery apparatus including a chamber that defines a feed end and a discharge end, a first valve proximate the feed end of the chamber, and a second valve proximate the discharge end of the chamber, wherein delivering the starch-bearing material to the material delivery apparatus comprises delivering the starch-bearing material to the chamber of the material delivery apparatus with the first valve open and the second valve closed;
    closing the first valve of the material delivery apparatus so as to pressure isolate the starch-bearing material within the chamber of the material delivery apparatus;
    adjusting a pressure within the chamber of the material delivery apparatus to a non-atmospheric pressure that is substantially equal to a non-atmospheric pressure in a process vessel downstream of the material delivery apparatus;

opening the second valve of the material delivery apparatus and delivering the starch-bearing material from the chamber of the material delivery apparatus to the process vessel; and heating the starch-bearing material within the process vessel.

2. The method of claim 1, wherein the starch-bearing material comprises at least one of a wheat, a bran, an oat, or a corn.

3. The method of claim 1, wherein at least one of increasing or decreasing the amount of moisture in the starch-bearing material comprises at least one of increasing or decreasing the amount of moisture in the starch-bearing material until the starch-bearing material exhibits a moisture content ranging from 14 wt % water to 55 wt % water.

4. The method of claim 3, wherein the hydration control apparatus comprises a mixer.

5. The method of claim 1, wherein adjusting the pressure within the chamber of the material delivery apparatus comprises increasing the pressure with the chamber until the pressure ranges from 10 psig to 55 psig.

6. The method of claim 5, wherein adjusting the pressure within the chamber comprises injecting steam into the chamber.

7. The method of claim 1, wherein heating the starch-bearing material within the process vessel comprises indirectly heating the starch-bearing material within the process vessel to a temperature ranging from 200 degrees F. to 300 degrees F.

8. The method of claim 1, wherein opening the second valve of the material delivery apparatus and delivering the starch-bearing material from the chamber of the material delivery apparatus to the process vessel comprises delivering the starch bearing to a second chamber positioned between the discharge end of the chamber and the process vessel such that the starch-bearing material substantially blocks fluid communication between the chamber and the process vessel, thereby establishing a gas composition at the discharge end of the chamber that is different than a gas composition in the process vessel.

9. The method of claim 1, wherein the material delivery apparatus comprises a first material delivery apparatus and further comprising a second material delivery apparatus positioned downstream of the process vessel, the second material delivery apparatus comprising a chamber that defines a feed end and a discharge end, a first valve proximate the feed end of the chamber, and a second valve proximate the discharge end of the chamber, the method comprising delivering the starch-bearing material from the process vessel to the second material delivery apparatus with the first valve open and the second valve closed.

10. The method of claim 1, further comprising drying the starch-bearing material until the starch-bearing material exhibits a moisture content less than 14 wt % water, and cooling the starch-bearing material to a temperature less than 100 degrees F.

11. A method for continuous treatment of a material containing a solid component at a non-atmospheric pressure, the method comprising:

delivering at a substantially atmospheric pressure the material containing the solid component to a first chamber having a feed end and a discharge end;

closing a first valve proximate the feed end of the first chamber;

adjusting a pressure of the first chamber to a non-atmospheric pressure substantially equal to a non-atmospheric pressure in a second chamber, the second chamber having a feed end and a discharge end, the second chamber being separated from the first chamber by a second valve located proximate the feed end of the second chamber and the discharge end of the first chamber;

opening the second valve;

delivering the material containing the solid component to the second chamber through the second valve;

continuously delivering the material containing the solid component from the second chamber to a process vessel in delivery communication with the second chamber, the process vessel operating at a non-atmospheric pressure, the second chamber being at substantially the same non-atmospheric pressure as the process vessel; and continuously processing the material containing the solid component in the process vessel.

12. A method according to claim 11, wherein the method includes the step of opening the first valve before the material is delivered to the first chamber.

13. A method according to claim 11, wherein the method includes the step of closing the second valve after the material has been delivered to the second chamber.

14. A method according to claim 11, wherein the material containing the solid component is in the form of particulate solids, pulverized solids, wetted solids, wet cake, paste or slurry.

15. A method according to claim 11, wherein the solid component includes one or more of a botanical, a herb, a spice, a pulse, a flour component, a whole grain bran fraction, a germ fraction, an endosperm fraction, and a starch.

16. A method according to claim 11, wherein continuously delivering the material containing the solid component from the second chamber to a process vessel step includes delivering the material from the second chamber to a feed metering mechanism and from the feed metering mechanism to the process vessel, the feed metering mechanism being at substantially the same non-atmospheric pressure as the second chamber and the process vessel.

17. A method according to claim 11, wherein the continuously processing includes one or more of pasteurization, sterilization, enzyme deactivation, starch modification, starch gelatinization, flavor modification, and material texture modification.

* * * * *